US011889017B2

(12) United States Patent
Charlson

(10) Patent No.: US 11,889,017 B2
(45) Date of Patent: Jan. 30, 2024

(54) SYSTEM, METHOD, AND APPARATUS FOR INITIATING OUTBOUND COMMUNICATIONS FROM A USER DEVICE

(71) Applicant: Joseph A. Charlson, Pittsburgh, PA (US)

(72) Inventor: Joseph A. Charlson, Pittsburgh, PA (US)

( * ) Notice: Subject to any disclaimer, the term of this patent is extended or adjusted under 35 U.S.C. 154(b) by 0 days.

(21) Appl. No.: 18/107,627

(22) Filed: Feb. 9, 2023

(65) Prior Publication Data

US 2023/0239398 A1 Jul. 27, 2023

Related U.S. Application Data

(63) Continuation of application No. 18/096,609, filed on Jan. 13, 2023.

(60) Provisional application No. 63/299,070, filed on Jan. 13, 2022.

(51) Int. Cl.
*H04M 3/42* (2006.01)
*H04M 3/22* (2006.01)
*H04M 3/60* (2006.01)

(52) U.S. Cl.
CPC ..... *H04M 3/42042* (2013.01); *H04M 3/2281* (2013.01); *H04M 3/60* (2013.01); *H04M 2203/6027* (2013.01)

(58) Field of Classification Search
CPC ........... H04M 3/42042; H04M 3/2281; H04M 2203/6027
See application file for complete search history.

(56) References Cited

U.S. PATENT DOCUMENTS

| 10,601,986 | B1* | 3/2020 | Botner ............... H04L 65/1046 |
| 10,848,618 | B1* | 11/2020 | Quilici .................. H04M 3/436 |
| 2007/0238449 | A1* | 10/2007 | Park ....................... H04W 48/02 |
| | | | 455/417 |
| 2016/0373576 | A1* | 12/2016 | Sankaranarayanan ....................... |
| | | | H04M 3/42093 |
| 2017/0085706 | A1* | 3/2017 | Kim ........................ H04W 4/16 |

(Continued)

OTHER PUBLICATIONS

"Phone by Google", retrieved from https://web.archive.org/web/20220111232822/https://play.google.com/store/apps/details?id=com.google.android.dialer, 2022, 3 pages.

*Primary Examiner* — Minjung Kim
(74) *Attorney, Agent, or Firm* — The Webb Law Firm

(57) ABSTRACT

Provided are systems, methods, and apparatuses initiating outbound communications. The system may include at least one processor of a telecommunications device comprising a display and a communication application, the at least one processor programmed or configured to: receive, with the communication application, a communication request comprising a number, the communication request initiated by a user of the telecommunications device, determine whether to automatically initiate a communication to the number based on recipient data associated with the number, in response to determining to not automatically initiate the communication to the number, prompt the user, on the display of the telecommunications device, with a selectable option configured to initiate the communication to the number upon selection, and in response to determining to automatically initiate the communication to the number, automatically initiate the communication to the number upon selection.

22 Claims, 4 Drawing Sheets

(56) References Cited

U.S. PATENT DOCUMENTS

| | | | |
|---|---|---|---|
| 2017/0150353 A1* | 5/2017 | Hillis | H04W 12/122 |
| 2019/0379711 A1* | 12/2019 | Sood | H04M 7/0078 |
| 2020/0053205 A1* | 2/2020 | Sial | H04M 3/42059 |
| 2020/0336910 A1* | 10/2020 | Boettcher | H04L 63/0853 |
| 2020/0358981 A1* | 11/2020 | Lee | H04W 4/18 |
| 2020/0366787 A1* | 11/2020 | Sharpe | H04M 15/56 |

* cited by examiner

SYSTEM, METHOD, AND APPARATUS FOR INITIATING OUTBOUND COMMUNICATIONS FROM A USER DEVICE

CROSS REFERENCE TO RELATED APPLICATIONS

This application is a continuation of U.S. application Ser. No. 18/096,609, filed on Jan. 13, 2023, which claims the benefit of U.S. Provisional Patent Application No. 63/299,070, filed on Jan. 13, 2022, the disclosures of which are hereby incorporated by reference in their entirety.

BACKGROUND

1. Field

This disclosure relates generally to communications via calls and text messages, and in non-limiting embodiments, to systems, methods, and apparatuses for initiating outbound communications from a user device.

2. Technical Considerations

When making a telephone call, sending a text message, or sending an email, it is implied that the caller/sender knows something about the entity with whom they are communicating. However, there is not an easy way to determine the legitimacy of the phone number, messaging short code, telephone number, or email address, and this is particularly difficult when responding to fraudulent emails, voice messages, pop-up ads, and malware where a sense of urgency is imparted to the caller/sender and the caller/sender believes they are communicating with an entity the caller/sender trusts. It is unreasonable for the average person to become a sleuth and ferret out the veracity of the telephone number or email address, particularly once a fraudster has created a sense of urgency in the mind of the caller/sender. Reverse phone number lookup services exist, but using one involves a person selecting such a service and typically purchasing some kind of report. However, with modern internet connected smart phones, softphones, and Voice-over-IP (VoIP) phones, there is an opportunity to validate the identity of the callee/intended recipient automatically as part of the communications process.

Today, the identity of the callee is typically presented firstly if it exists and as it exists in the caller's Contacts/Address Book, and if no such entry exists on certain smart phones, carrier networks may present a business or person's name that appears in a CNAM (Caller ID Name) database. This is the information that is presented to the recipient of a call. A key limitation of Caller ID Name is that phone networks have allowed illegitimate caller ID spoofing where one party masquerades as another. STIR (Secure Telephony Identity Revisited)/SHAKEN (Signature-based Handling of Asserted information using toKENs) is an industry-standard caller ID authentication technology, comprised of a set of technical standards and protocols that allow for the authentication and verification of caller ID information for calls carried over Internet Protocol (IP) networks and is intended to combat caller ID spoofing on public telephone networks. It primarily is designed to prevent illegitimate caller ID spoofing and blocking of an unsolicited call for callers whose identity cannot be verified. None of these solutions addresses the issue of knowing the true ownership of a phone number for a person seeking to call a number they have received purporting to be a trusted business. For example, there is no straightforward method for a consumer to know whether the phone number they are told to call in a fraudulent email they received about their recent Amazon® order is really a number controlled by Amazon®. These telecommunications fraudsters publish phone numbers in malware pop-ups in browsers, in emails, and on voicemails purporting to be trusted entities such as the IRS, Microsoft®, Bank of America®, etc. The recipients of these phone numbers have no practicable means of verifying the identity of whom they may be calling.

In cases where the number is a part of the recipient's Contacts/Address Book, there is no mechanism of verifying the identity of the current responsible party/owner of the phone number. For example, if a person is texted an MMS message from a fraudster masquerading as an official representative of a business or government agency, e.g., the IRS, with a contact card attachment asking the recipient to Add to Contacts, whereby the integrity of the recipient's Contacts/Address Book is compromised, there exists no practicable mechanism to verify the true identity of the party responsible for the telephone number during inbound calls from, and when making outbound calls to, the telephone number because the Contacts/Address Book entry is given precedence by the telephone handset providers' operating system applications and no mechanism exists for pointing out discrepancies and presenting verified information about the authenticity of the identity ascribed to the telephone number.

An additional problem is the ability to track and maintain a history of companies you have requested to stop calling you, e.g., remove from their calling lists, place on their Do Not Call list, or responding STOP to cease text messages. These requests can often feel ineffective and do not support easy one-stop centralized management of opt-in/out by communications channel and communication preferences by channel, e.g., "please do not call me but you may text me," or "text me first and then when it makes sense I will agree to a call."

An additional problem that is not currently solved by the prior art is the preponderance of misdialed/wrong party calls where a caller either has the incorrect number of the intended callee due to an intentionally misleading telephone number being provided on a form, e.g., online inquiry form, or because the telephone number published in an advertisement, an email, or website is incorrect (a mistake) or because the caller simply miskeys the digits of a telephone number seen in a television ad, heard on the radio, displayed on a website, etc. These misdialed/wrong party calls are an interruptive nuisance to the called party and additionally waste the time of the caller.

An additional problem not solved by the prior is that dialer/phone applications do not store the rich information provided by lookups potentially performed by the receiving carrier, by the handset operating system native dialer/phone, and by the third-party dialer/phone; they do not store the automated call screening history that is offered by some dialers, nor do they directly display the most recent text information exchanged with the specific calling phone number nor with the associated entity. They simply act as a finite log of calls received over time by a given number with access to the local Contacts record and a history of calls received and sent to a given number. To access the text message history, the user must launch the messaging application and reference it there. There is no way to link an outbound dialing history to a short code or alternate number the user has texted with from the same entity using phone number registration data unless the user has created a Contacts/Address Book entry containing both numbers. Further, there is typically no entry field for a company short code found in the Contacts/Address Book unless the user understands they can place a short code in a telephone field. Short codes are registered and company telephone numbers and 10-digit longcodes (10DLC/local numbers) must be registered to the entity's brand in order to text. With the STIR/SHAKEN protocol and similar proprietary frameworks such as Google® Verified Calls, enhanced caller ID data and rich call data (e.g., logo and reason for call) can be transmitted to a user's device during an inbound call and displayed in the dialer/phone, but there exists no mechanism for collating this attested data and combining it with other data, such as a registered telephone number and texting data, text history data, call screening application data, call response by text data, voicemails, and third party scam/phishing/fraud data in one place in the dialer application for the user.

SUMMARY

According to non-limiting embodiments or aspects, provided is a system comprising: at least one processor of a telecommunications device comprising a display and a communication application, the at least one processor programmed or configured to: receive, with the communication application, a communication request comprising a number, the communication request initiated by a user of the telecommunications device; determine whether to automatically initiate a communication to the number based on recipient data associated with the number; in response to determining to not automatically initiate the communication to the number, prompt the user, on the display of the telecommunications device, with a selectable option configured to initiate the communication to the number upon selection; and in response to determining to automatically initiate the communication to the number, automatically initiate the communication to the number upon selection.

In non-limiting embodiments or aspects, the at least one processor is further programmed or configured to retrieve the recipient data based on the number from at least one database. In non-limiting embodiments or aspects, wherein determining whether to automatically initiate the communication is based on a score derived from the recipient data. In non-limiting embodiments or aspects, the communication application comprises a dialer application, a messaging application, or any combination thereof. In non-limiting embodiments or aspects, the recipient data comprises at least one of the following: a verified identity of an entity associated with the number, crowd-sourced data, a callee number history, or any combination thereof. In non-limiting embodiments or aspects, the recipient data comprises image data, and the at least one processor is further programmed or configured to present the image data on the display of the telecommunications device prior to initiating the communication.

In non-limiting embodiments or aspects, the recipient data comprises a match result between the number and at least one of a contact list, a communication history, and a previously-approved list stored on the telecommunications device, and the at least one processor determines to automatically initiate the communication if the number matches with the contact list and/or communication history. In non-limiting embodiments or aspects, wherein determining whether to automatically initiate the communication to the number based on the recipient data associated with the number comprises: communicating a query comprising the number to a central database; and receiving, from the central database, a verification response based on the number, the recipient data comprising the verification response. In non-limiting embodiments or aspects, wherein determining whether to automatically initiate the communication to the number based on the recipient data associated with the number comprises: communicating a query comprising the number to at least one fraud database; and receiving, from the fraud database, fraud data based on the number, the recipient data comprising the fraud data. In non-limiting embodiments or aspects, the at least one processor is further programmed or configured to: obtain communication data from at least one prior communication initiated by an entity and received by the communications device, the communication data comprises at least a portion of the recipient data.

In non-limiting embodiments or aspects, the at least one processor is further configured to prompt a user before initiating the communication to select profile data to be shared with a recipient of the communication. In non-limiting embodiments or aspects, the at least one processor is further configured to: maintain a data repository of registered entities local on the telecommunications device, the recipient data comprises information from the data repository. In non-limiting embodiments or aspects, the at least one processor is further programmed or configured to: prior to determining whether to automatically initiate the communication to the number based on the recipient data associated with the number, communicating the communication request from the telecommunications device to a switching system; and receiving, from the switching system, the recipient data. In non-limiting embodiments or aspects, the at least one processor is further programmed or configured to: in response to user input on the telecommunications device, display at least a portion of the recipient data.

According to non-limiting embodiments or aspects, provided is a method comprising: receiving, with at least one processor, a communication request initiated by a user of a telecommunications device; determining, with the at least one processor, whether to automatically initiate a communication to a number based on recipient data associated with the number; and in response to determining to not automatically initiate the communication to the number, prompting the user, on a display of the telecommunications device, with a selectable option configured to initiate the communication to the number upon selection.

In non-limiting embodiments or aspects, the at least one processor is a switch processor located remote from the telecommunications device. In non-limiting embodiments or aspects, determining whether to automatically initiate the communication is based on a score generated derived from the recipient data. In non-limiting embodiments or aspects, the recipient data comprises a verified identity of an entity associated with the number. In non-limiting embodiments or aspects, the recipient data comprises image data, the method further comprising presenting the image data on the display of the telecommunications device prior to initiating the communication. In non-limiting embodiments or aspects, the method further comprises: before initiating the communication prompting a user on the telecommunications device to select profile data to be shared with a recipient of the communication.

According to non-limiting embodiments or aspects, provided is a computer program product comprising at least one non-transitory readable medium including program instructions that, when executed by at least one processor, cause the at least one processor to: receive a communication request initiated by a user of a telecommunications device; determine whether to automatically initiate a communication to a number based on recipient data associated with the number; and in response to determining to not automatically initiate the communication to the number, prompt the user, on a display of the telecommunications device, with a selectable option configured to initiate the communication to the number upon selection.

Further non-limiting embodiments or aspects are shown in the following clauses:

Clause 1: A system comprising: at least one processor of a telecommunications device comprising a display and a communication application, the at least one processor programmed or configured to: receive, with the communication application, a communication request comprising a number, the communication request initiated by a user of the telecommunications device; determine whether to automatically initiate a communication to the number based on recipient data associated with the number; in response to determining to not automatically initiate the communication to the number, prompt the user, on the display of the telecommunications device, with a selectable option configured to initiate the communication to the number upon selection; and in response to determining to automatically initiate the communication to the number, automatically initiate the communication to the number upon selection.

Clause 2: The system of clause 1, wherein the at least one processor is further programmed or configured to retrieve the recipient data based on the number from at least one database.

Clause 3: The system of clauses 1 or 2, wherein determining whether to automatically initiate the communication is based on a score derived from the recipient data.

Clause 4: The system of any of clauses 1-3, wherein the communication application comprises a dialer application, a messaging application, or any combination thereof.

Clause 5: The system of any of clauses 1-4, wherein the recipient data comprises at least one of the following: a verified identity of an entity associated with the number, crowd-sourced data, a callee number history, or any combination thereof.

Clause 6: The system of any of clauses 1-5, wherein the recipient data comprises image data, and wherein the at least one processor is further programmed or configured to present the image data on the display of the telecommunications device prior to initiating the communication.

Clause 7: The system of any of clauses 1-6, wherein the recipient data comprises a match result between the number and at least one of a contact list, a communication history, and a previously-approved list stored on the telecommunications device, and wherein the at least one processer determines to automatically initiate the communication if the number matches with the contact list and/or communication history.

Clause 8: The system of any of clauses 1-7, wherein determining whether to automatically initiate the communication to the number based on the recipient data associated with the number comprises: communicating a query comprising the number to a central database; and receiving, from the central database, a verification response based on the number, the recipient data comprising the verification response.

Clause 9: The system of any of clauses 1-8, wherein determining whether to automatically initiate the communication to the number based on the recipient data associated with the number comprises: communicating a query comprising the number to at least one fraud database; and receiving, from the fraud database, fraud data based on the number, the recipient data comprising the fraud data.

Clause 10: The system of any of clauses 1-9, wherein the at least one processor is further programmed or configured to: obtain communication data from at least one prior communication initiated by an entity and received by the communications device, wherein the communication data comprises at least a portion of the recipient data.

Clause 11: The system of any of clauses 1-10, wherein the at least one processor is further configured to prompt a user before initiating the communication to select profile data to be shared with a recipient of the communication.

Clause 12: The system of any of clauses 1-11, wherein the at least one processor is further configured to: maintain a data repository of registered entities local on the telecommunications device, wherein the recipient data comprises information from the data repository.

Clause 13: The system of any of clauses 1-12, wherein the at least one processor is further programmed or configured to: prior to determining whether to automatically initiate the communication to the number based on the recipient data associated with the number, communicating the communication request from the telecommunications device to a switching system; and receiving, from the switching system, the recipient data.

Clause 14: The system of any of clauses 1-13, wherein the at least one processor is further programmed or configured to: in response to user input on the telecommunications device, display at least a portion of the recipient data.

Clause 15: A method comprising: receiving, with at least one processor, a communication request initiated by a user of a telecommunications device; determining, with the at least one processor, whether to automatically initiate a communication to a number based on recipient data associated with the number; and in response to determining to not automatically initiate the communication to the number, prompting the user, on a display of the telecommunications device, with a selectable option configured to initiate the communication to the number upon selection.

Clause 16: The method of clause 15, wherein the at least one processor is a switch processor located remote from the telecommunications device.

Clause 17: The method of clauses 15 or 16, wherein determining whether to automatically initiate the communication is based on a score generated derived from the recipient data.

Clause 18: The method of any of clauses 15-17, wherein the recipient data comprises a verified identity of an entity associated with the number.

Clause 19: The method of any of clauses 15-18, wherein the recipient data comprises image data, the method further comprising presenting the image data on the display of the telecommunications device prior to initiating the communication.

Clause 20: The method of any of clauses 15-19, further comprising: before initiating the communication prompting a user on the telecommunications device to select profile data to be shared with a recipient of the communication.

Clause 21: The method of any of clauses 15-20, further comprising: in response to user input on the telecommunications device, displaying at least a portion of the recipient data.

Clause 22: A computer program product comprising at least one non-transitory readable medium including program instructions that, when executed by at least one processor, cause the at least one processor to: receive a communication request initiated by a user of a telecommunications device;

determine whether to automatically initiate a communication to a number based on recipient data associated with the number; and in response to determining to not automatically initiate the communication to the number, prompt the user, on a display of the telecommunications device, with a selectable option configured to initiate the communication to the number upon selection.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
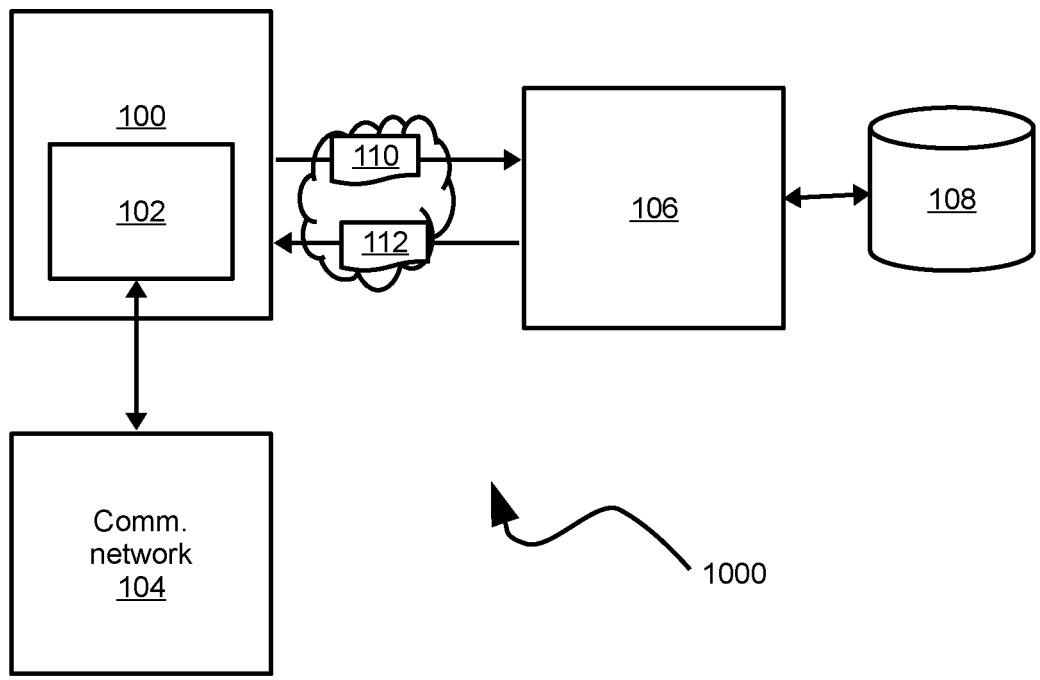
FIG. 1 is a diagram for a system for initiating outbound communications from a user device according to non-limiting embodiments or aspects.

For purposes of the description hereinafter, the terms "dialer" and "phone" applications should be viewed as one in the same as synonyms for the software a user utilizes to make and receive calls.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

Referring to FIG. 1, shown is a system 1000 for initiating outbound communications from a user device according to non-limiting embodiments or aspects. A user device 100 may include a computing device such as a mobile phone (e.g., smartphone), tablet computer, personal computer, and/or the like. The user device 100 may include a communications application 102 installed thereon. The communications application 102 may include, for example, a dialer application, a text messaging application, and/or the like. In some examples, the communications application 102 may be a native dialer application or messaging application (e.g., such as an Android® or iOS application), however it will be appreciated that various other communications applications may be used, such as Google® Voice, Phone by Google®, Messages by Google®, Zoom®, Meta Messenger, and/or the like.

The user device 100, via the communications application 102 and one or more communication devices (e.g., cellular or wireless network antennae), is in communication with a communications network 104. The communications network 104 may include a Public Switch Telephone Network (PSTN) and/or any other type of communications network. Through this communication, the communications application 102 may initiate outbound telephone calls, receive incoming telephone calls, initiate outbound messages (e.g., Short Message Service (SMS) messages or other types of text and/or multimedia messaging), receive incoming messages, and/or the like.

The user device 100 may be in communication with a remote server computer 106 via one or more public and/or private networks (e.g., such as the Internet). The remote server computer 106 may be in communication with a database 108 that it accesses upon request. For example, a request message 110 from the user device may be received through an Application Programming Interface (API) or other like mechanism. In response to the request message 110, the server computer 106 may query the database 108, generate a response message 112, and communicate the response message 112 to the user device 100. In some non-limiting embodiments, the user device 100 may query a database local to the user device. For example, if information from a previous query (e.g., to a central server and/or database 108) is stored locally, or if the user device originally has such information, the communication application may use the locally stored data. This may be, in some examples, based on how long the data has been stored locally (e.g., if it is up-to-date) based on a specified temporal threshold. In some examples, databases may be local and remote, such that multiple queries may be made. It will be appreciated that various arrangements of database(s) are possible.

In non-limiting embodiments, the user device 100 may initiate a communication in response to a user entering a phone number in a dialer application, selecting a name, phone number, or link on the user device 100, or sending a text message. For example, a user may choose to return a missed call, to call a phone number listed in a text message, or to respond to a text message. The user device 100 may determine whether to automatically initiate a communication to a number based on recipient data associated with the number. For example, the user device 100 may extract recipient data from the response message 112 and/or identify recipient data local to the user device 100. Recipient data may include a score (e.g., a fraud score or SPAM score), a call and/or text message history of the caller, a call and/or text message history of the callee (e.g., recipient of the communication), carrier analytics, crowd-sourced data (e.g., identity data, reputational data, and/or the like), and/or the like. In some non-limiting embodiments, the user device 100 may determine whether to automatically initiate a communication to the number based on comparing a score or other value from the recipient data or derived from the recipient data to a threshold and determining if the score satisfies (e.g., meets or exceeds) the threshold.

In non-limiting embodiments in which it is determined to not automatically initiate the communication, the user may be prompted, on the display of the user device 100 and/or audibly by the user device 100, to an option to initiate the communication. For example, a user may have to select a button, speak a command, make a gesture, and/or make another type of input in response to which the communication may commence. In some non-limiting embodiments, the prompt may provide the user with information about the number being communicated with. In non-limiting embodiments in which it is determined to automatically initiate the communication, the communication may commence without further input from the user. For example, a dialer application on the user device 100 may initiate an outbound call to the communications network 104 by sending a message to a switch.

In non-limiting embodiments, during an outbound communication, the user device 100 may display an option for the user to view at least a portion of the recipient data. For example, a single click, selection, or some other user input may cause the user device 100 to display recipient data on the device. This may include, for example, rating information, score information, and/or other like data. In such examples, the user of the user device 100 may be able to validate that the callee being communicated with matches the recipient data. Additional data may also be retrieved and displayed, such as registration data, reputational data, crowd-sourced data, and/or the like.

In some non-limiting embodiments, the user of the user device 100 may retrieve and/or request caller and/or sender data (e.g., caller data, data about an entity sending a message, etc.) during an inbound call in the same manner described above with respect to callee data (e.g., recipient data) during an outbound call. For example, a communication application on the user device 100 may present a selectable option during an inbound call and/or text message for the user to request caller and/or sender information from a local database and/or remote database (e.g., database 108). As a further example, a user that receives a text message may select an option on the message in application and/or select the phone number to present caller and/or sender information on the display of the user device 100. In such examples, caller and/or sender information may be retrieved one or more databases, including aggregating and collating information from multiple sources, with a simple user input (e.g., a single click or the like).

Figure 2:
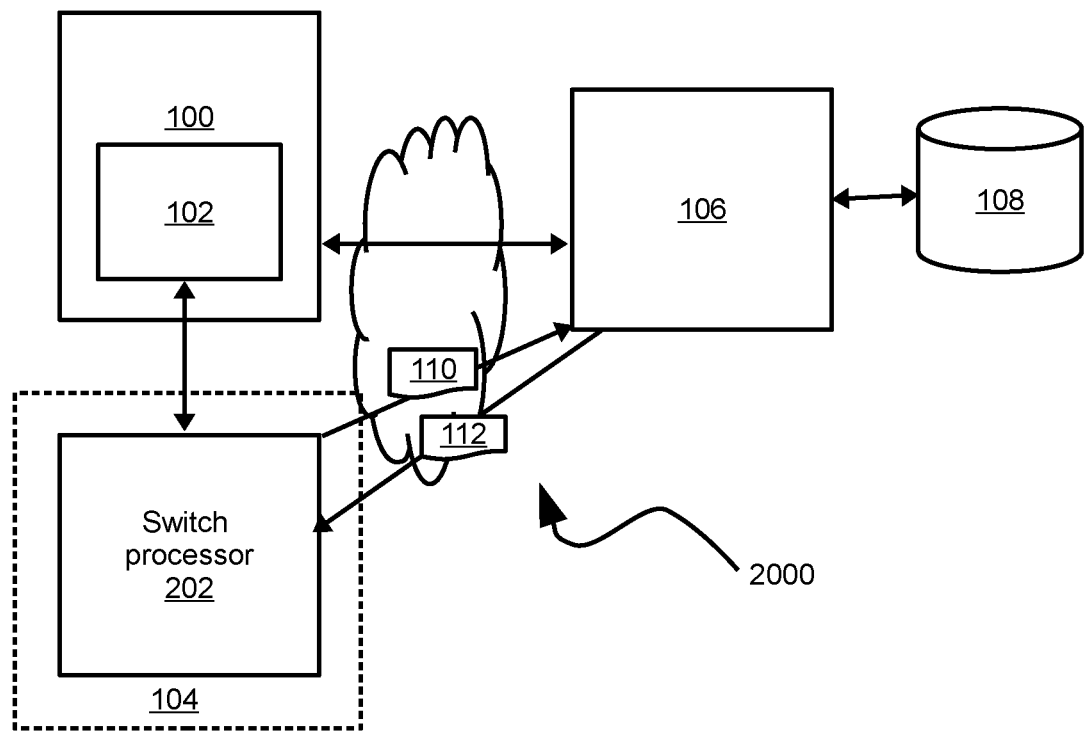
FIG. 2 is another diagram for a system for initiating outbound communications from a user device according to non-limiting embodiments or aspects.

Referring now to FIG. 2, shown is a system 2000 for initiating outbound communications from a user device according to non-limiting embodiments or aspects. The system 2000 in this example includes a switch processor 202 as part of the communications network 104. The switch processor 202 may be one or more computing devices associated with an intermediate switching system that receives an initial communication request from the user device 100 and determines whether to automatically initiate the communication request without further input from the user. In this non-limiting embodiment, the switch processor 202 may perform one or more of the steps discussed above being performed by the user device 100.

Still referring to FIG. 2, in non-limiting embodiments, in response to receiving an initial communication request from the user device 100 (e.g., a user attempting to make an outbound call or send an outbound text message), the switch processor 202 may send a request message 110 to a remote server computer 106. The request message 110 may include a phone number, name, alias, and/or the like such that the server computer 106 may identify recipient data and communicate it to the switch processor 202 via a response message 112. The switch processor 202 may extract recipient data from the response message 112, identify recipient data local to the switch processor 202, and/or receive recipient data from the user device 101. Recipient data may include a score (e.g., a fraud score or SPAM score), a call and/or text message history, and/or the like. In some non-limiting embodiments, the switch processor 202 may determine whether to automatically initiate a communication to the number based on comparing a score or other value from the recipient data or derived from the recipient data to a threshold and determining if the score satisfies (e.g., meets or exceeds) the threshold.

The determination of whether to automatically initiate a communication may be based on recipient data, which includes elements of the recipient data itself and/or data derived from (e.g., calculated or determined based on) the recipient data. For example, the recipient data may include a verified identity of an entity, such as a verification indicator (e.g., a binary flag of verified/not-verified), a verification score, a digital signature, and/or the like. In some non-limiting embodiments, the recipient data may include a match result (e.g., a binary flag of whether a match occurred and/or a matching score) between the number and a contact list, communication history (e.g., call or text message history), and/or a previously-approved list of approved (or non-approved) numbers. The recipient data may be local to the device and/or be obtained from a remote system (e.g., such as a switch processor, carrier service, web server, and/or the like). In such examples, determining to automatically initiate a communication may be based on determining that the number being called or messaged matches (e.g., is a match or has a match score that satisfies a threshold). In some non-limiting embodiments, determining to automatically initiate a communication may be based on communication history that includes communication data from at least one prior communication initiated by an entity, such as the content of text messages, the content of voicemails, missed call records, answered call or message records, outbound call and text messages, and/or the like.

In some non-limiting embodiments, the recipient data may include image data. For example, the image data may include a logo, verification icon, warning icon, and/or the like. In such embodiments, the user device 100 may display the image data prior to initiating the communication. For example, the image data may be displayed with a prompt for further user input before initiating the communication. The image data may also be displayed in examples where the communication is automatically initiated. In some examples, the image data may include a verification icon that represents a verified number or a warning icon that represents an unverified number or potential fraud, SPAM, or the like.

In non-limiting embodiments, the database 108 may include fraud data and the request message 110 may be a query to obtain a fraud score and/or some aspect of the fraud data. The fraud data may include, for example, a score representing a likelihood of the number being fraudulent, a binary indication of fraud or no-fraud, and/or the like.

In some non-limiting embodiments, the user device 100 and/or switch processor 202 may maintain a data repository of registered entities. The registered entities may be periodically updated automatically or upon request.

In some non-limiting embodiments, recipient data may be displayed to a user regardless of an approval the first time that a communication is attempted to that recipient. For example, a user may be prompted before a call or text message is completed the first time that the number is communicated with, based on a call or text message history, regardless of a score or content of the recipient data.

Figure 3:
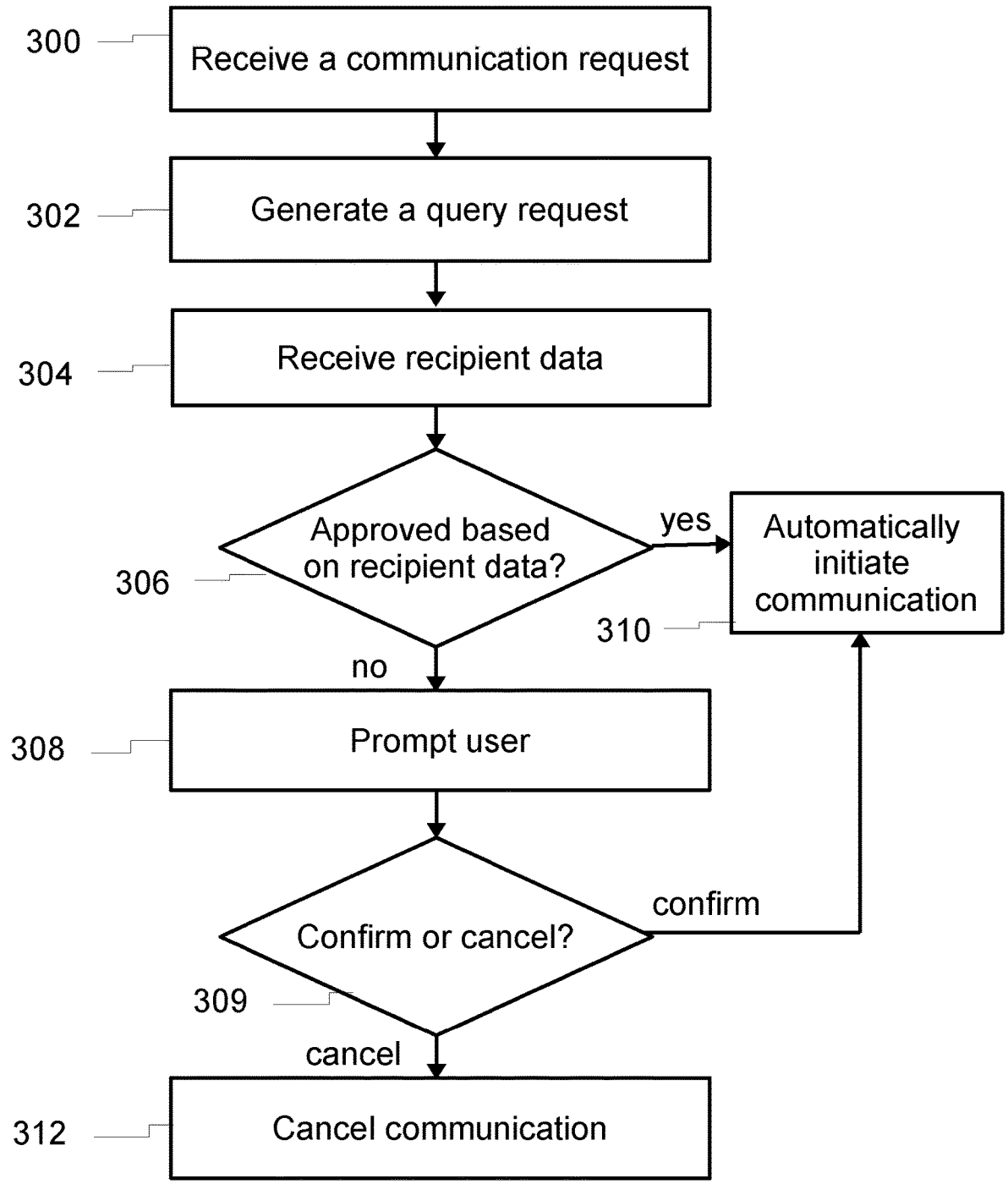
FIG. 3 is a flow diagram for a method for initiating outbound communications from a user device according to non-limiting embodiments or aspects.

Referring now to FIG. 3, shown is a flow diagram for a method of initiating outbound communications according to non-limiting embodiments. The steps shown in FIG. 3 are for example purposes only. It will be appreciated that additional, fewer, and/or a different order of steps may be implemented in non-limiting embodiments. At step 300, a communication request is received. This may include, for example, a dialer application or messaging application on a user device detecting a user request for a call (e.g., entering a number and pressing a call button, sending a text message, and/or the like). In some non-limiting embodiments, a switch processor remote from the user device (e.g., such as a server maintained by a service provider) may receive a communication request from the user device.

At step 302 of FIG. 3, a query request is generated. The query request may be generated by the user device in response to the communication request or may be generated by a switch processor in response to receiving a communication request from the user device. The query request may include a telephone number, name, network address, and/or other information associated with the communication request (e.g., an entity that the user of the user device is attempting to communicate with). The query request may be an API request in some examples. The query request may also be an HTTP query or may use any other communication protocol. The query request may be communicated to a server computer, such as a third-party service provider, a verification entity, a central authority, and/or the like. In some examples, the server computer and/or database being queried may be maintained by an industry association, e.g., such as a Cellular Telecommunications Industry Association (CTIA) registered entity database or the like, to look up and present true number ownership information prior to calling or texting a number.

At step 304, recipient data may be received by the user device and/or switch processor. In some examples, the recipient data may be received in response to the query generated at step 302. In some examples, the recipient data may be retrieved from resources local to the user device or switch processor. In some examples, the recipient data may include a combination of data received from a server computer and data retrieved from local resources.

At step 306, the user device or the switch processor determines whether to approve the communication request based on the recipient data (e.g., whether to automatically initiate the communication without prompting the user). For example, the user device or the switch processor may compare a score from the recipient data (e.g., a fraud score, a verification score, and/or the like) to a threshold and, if the score satisfies the threshold, determine to approve the communication request. The threshold may be predetermined and/or may be configurable by a user (e.g., based on a tolerance).

If the communication request is approved at step 306, the method may proceed to step 310 and the communication may be automatically initiated without prompting the user. For example, a telephone call may be completed such that it connects to a switch that rings the recipient phone, a text message may be transmitted to the recipient, and/or the like. In some examples, image data may be displayed on the user device indicating that the communication request is approved and/or the number is verified.

If the communication request is not approved at step 306, the method proceeds to step 308 and the user is prompted on the user device to provide an input. The prompt may be visual and/or audible. The prompt may provide information about the communication request, such as a score, indication of possible fraud, warning icon, and/or the like. In response to user input (e.g., selection of a button, a gesture, a spoken command, etc.), the user confirms the communication request or cancels the communication request at step 309. For example, a user may be provided with a single option to proceed, a single option to cancel, multiple options to proceed or cancel, and/or the like. If the user confirms at step 309, the method may proceed to step 310 and the communication may be initiated. If the user cancels and/or does not confirm at step 309, the method may proceed to step 312 and the communication request may be cancelled. If the communication request is cancelled, the number and/or entity may be stored in a database local and/or remote to the communication device to be used as recipient data in future interactions.

Figure 4:
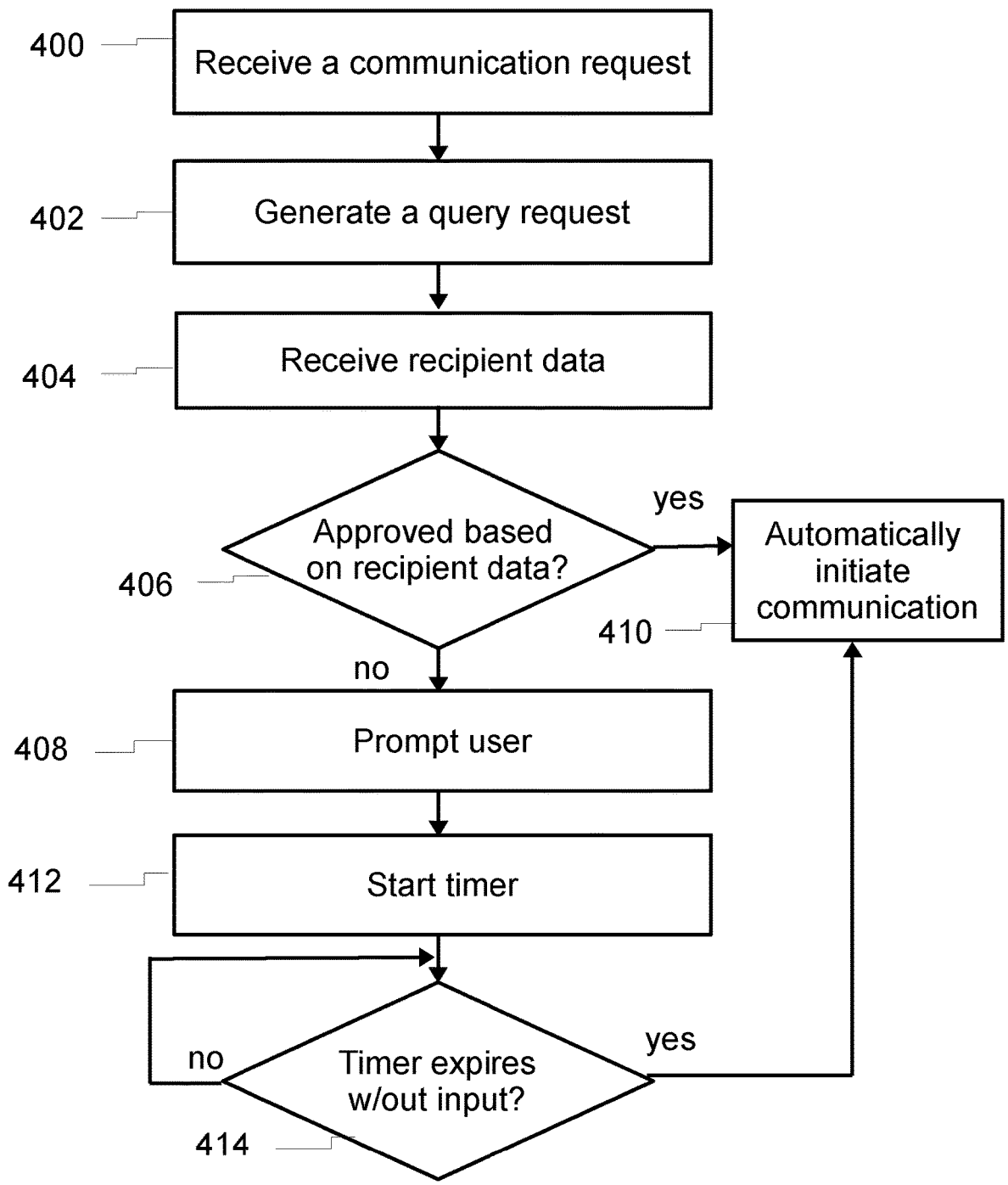
FIG. 4 is another flow diagram for a method for initiating outbound communications from a user device according to non-limiting embodiments or aspects.

Referring now to FIG. 4, shown is a flow diagram for a method of initiating outbound communications according to non-limiting embodiments. It will be appreciated that additional, fewer, and/or a different order of steps may be implemented in non-limiting embodiments. Steps 400, 402, 404, 406, 408, and 410 may be as described above in FIG. 3 for steps 300, 302, 304, 306, 308, and 310, respectively. At step 412, after the user is prompted at step 408, a programmatic timer may be started. The programmatic timer may be configured with a time period that is predetermined and/or set by the user. If the timer expires at step 414 and the user does not provide input during the time period (e.g., by affirmatively cancelling the communication request), the method may proceed to step 410 and the communication may be automatically initiated. Accordingly, the user may be provided with a delay during which the communication request can be cancelled such that the user can read any recipient data and/or warnings and decide whether to proceed. It will be appreciated that, in other non-limiting embodiments, the timer may be used to automatically cancel the communication request instead of initiate it such that step 410 is performed if the user affirmatively requests to proceed with the communication request within the time period and, otherwise, the communication request is cancelled.

In some non-limiting embodiments, a dialer application may include an entry box to search externally (e.g., on the Internet and/or a private database) based on registered organizations (e.g., such as a name of a company or individual) and receive, in return, registered information results that can be selected and called and/or texted. For example, if a user is uncertain that a call or text message came from Company X, the user may type "Company X" while the dialer or text message displays the number that the call or message came from. In some non-limiting embodiments, such registered information may be used to request a call or text message from the entity rather than make an outbound call or message.

In some non-limiting embodiments, the user device and/or communications application thereon may use the retrieved recipient information (e.g., such as registered entity information) to manage communication preferences and permissions with the registered entity across any and all multi-channel communications campaigns from the registered entity.

In some non-limiting embodiments, the communication application may automatically create an entry in a Registered Contacts/Registered Entity address book separate from but accessed alongside the user's personal contacts, and the automated Registered Contacts may be synchronized when accessed with updates from a centralized registered contacts database. In such examples, the user may select from one or more response modalities including but not limited to directly communicating information with pre-configured response types configured for the registered entity, such as opt-out/opt-in information, file a complaint, and/or the like.

In some non-limiting embodiments, the communication application may use the retrieved information and/or the attested entity information from a STIR/SHAKEN protocol and/or from a related caller ID authentication framework performed on an inbound communication to the user device to store rich call information in a local call history database and/or another local database on the user device. In such examples, tools may be provided to the user to manage communications preferences, permissions, and complaints with the entity, the user's carrier, the handset operator, the dialer application, and/or the connectivity partner or outbound calling telephony provider.

In non-limiting embodiments, a handset plus telephone number for carrier level attestation on outbound calls from a person to an entity may be used to provide authentication of the person to the entity and to streamline the handling of the call. In non-limiting embodiments, a handset plus telephone number for connectivity partner level attestation on outbound text messages from a person to an entity may be used to provide authentication of the person to the entity and to streamline the handling of the text message. In non-limiting embodiments, a handset plus telephone number for carrier level attestation on outbound calls from a person to a person may be used to provide authentication of the person to the called or messaged person and to share identity and selected user profile information with the called/messaged person.

In non-limiting embodiments, the dialer or messaging application may be used to access the user's detailed contact and/or profile information with name, photo, image, URLs, other contact means, social media handles, address, and/or the like, and query the user on the user device (e.g., via a prompt on the display or audibly) before initiating the communication (e.g., making the call or sending the text message) to select whether to include no information, verified caller ID name information, additional user profile information, and/or a combination thereof, with the outbound communication (e.g., as metadata, embedded data, and/or the like).

In non-limiting embodiments, the dialer or messaging application may be used to present the registered entity information and/or associated rich data to the user but then delay the actual initiation of the call or the sending of the message, thereby providing an opportunity for the user to review the retrieved information during the delay with an option to cancel the outgoing communication if necessary. Upon expiration of the delay without the user cancelling the outbound communication, the communication application and/or switch processor may then proceed with initiating the call or sending the message without further input from the user.

In non-limiting embodiments, provided is a system including at least one processor of a telecommunications device (e.g., a mobile device, a landline telephone, and/or the like) having a display and a communication application (e.g., a messaging application, a dialer application, and/or the like), the at least one processor programmed or configured to: receive, with the communication application, a communication request comprising a number (e.g., a telephone number, an SMS short code, and/or the like), the communication request initiated by a user of the telecommunications device; determine whether to automatically initiate a communication to the number based on recipient data associated with the number; in response to determining to not automatically initiate the communication to the number, prompt the user, on the display of the telecommunications device, with a selectable option configured to initiate the communication to the number upon selection; and in response to determining to automatically initiate the communication to the number, automatically initiate the communication to the number upon selection. A method and computer program product are also described herein.

In non-limiting embodiments, a system, method, and computer program product are provided for utilizing a certified identity and reputation lookup system to apprise the caller/sender of the party responsible for the phone number or other messaging communications moniker, such as short code or registered text messaging chatbot. Non-limiting embodiments provide an API for communications applications (e.g., dialer applications, messaging applications, web sites, and/or the like) executed by user devices (e.g., mobile phones, smartphones, landline phones, IP phones, and/or the like) to retrieve authenticated ownership information and related meta data for communications monikers, e.g., telephone numbers, short codes, registered text messaging chatbots, and/or the like. Non-limiting embodiments assist users with communicating with their intended entities and help to prevent communication with fraudsters and misdirected communications, e.g., misdials. There are many means of entering a number into a dialer application, such as direct typing, speech to text, HTML Tel tag, or other phone number identification by the computer or phone operating system, messaging application, or browser application. Once a number is entered, the dialer (or other communication application) can proceed to perform lookups of the associated identity from at least one external database of vetted organization information in combination with the user's call history and Contacts/Address Book. The dialer will display the registered owner of the number if one exists and query/prompt (e.g., audibly and/or visually) the user if they want to proceed with calling this organization based on the retrieved information. If no registered entity can be identified, the dialer may present registered entities with similar numbers to assist the user in correcting a mistyped/wrong number. The communication application will perform this lookup and for at least non-registered numbers, query the user at least one time before the user has ever completed a call/text to the specified entity or has completed a call/text in the extent of the user's telephone history. In a non-limiting embodiment, a higher security mode is made available in which the communication application will confirm that the user intends to make a call on each call attempt to the specified entity or to all numbers lacking registered entity information. By apprising people of the registered identity of the phone numbers and other communication monikers and providing direct access to reputation information in the communication applications for dialing and messaging, and by acting as a gate in the communications flow from online media to these applications, the user is better able to control with whom they are sharing sensitive information and can avoid misdirected and misdialed calls/texts. By including an option to review third-party entity reputation information and related industry membership and credentials of an entity from within the dialer or messaging application, the user can become better informed about the entity, be alerted to potential warnings or issues, and make better decisions about with whom they choose to communicate. By including information on whether the number selected or if there is a related entity number that is capable of receiving, processing, and responding to text messages, the communication application (such as a dialer) can provide a means for the user to directly initiate contact via text message with the entity.

A user can also type or input user speech-to-text to enter names in the communication application text entry box to perform a search by name. In this case, the communication application will return matches from the user's Contacts/Address Book and in non-limiting embodiments will also search for registered entities matching the search string. When an entity is searched, if a department is not specified, the communication application will prioritize an entity's number listed as Main and Customer Service in the registered entity telephone number entries.

For example, the text entry box in one of or both the dialer and messaging applications may return matches from the user's Contacts/Address Book and will search externally for registered entities matching a number or registered entities matching a name the user enters. In the received registered data, the dialer and messaging applications can inform the user of numbers that are registered to receive calls and those that are registered or to receive and respond to text messages.

For inbound calls, when the authenticity of an inbound call can be affirmed by STIR/SHAKEN attestation or other vetted information identity source, the identity information may be stored in the Call History (or another database local to the user device) along with the logo, call reason, and attestation level. Remote databases may also be used. For inbound messages, when the registered identity can be affirmed by a certified lookup, this information may appear and be stored in the message thread.

In a non-limiting embodiment, the user is presented with the retrieved data prior to initiating the actual outbound dial or sending of the message to the connectivity for a review period, and the outbound communication then proceeds/effectuates after the delay unless the user intervenes to cancel the communication prior to the expiration of the review delay.

This service may occur prior to initiating the call/connection or prior to sending the message/email so that the caller/sender is informed of the verified identity or lack thereof for the phone number/email address. Non-limiting embodiments would additionally provide alerts to reports of scam activity related to the number. The user when presented with this information can make an informed decision as to whether to continue with the outbound communication or whether to abort it and optionally report it. Once a number is added to the user's Contacts/Address Book, the pre-communication lookup service may optionally be suspended on this number for businesses until the phone number changes ownership, or for some prescribed duration, or until the contact is removed from the user's Contacts/Address Book. For traditional landline phones that lack the internet connection, for situations with organization/entity level telecommunications switches, and for situations where the lookup is delayed, non-limiting embodiments may present the information through a redirect of the call to a processing stage where the verifiable information is verbally/audibly communicated and/or on-screen communication of the callee's (e.g., recipient's) identity to the caller either prior to connecting the caller with the dialed number or without a pre-call redirect wherein this information could be verbally/audibly and visually communicated to the caller while the call is in progress. Additionally, such pre-call gating may require the user to complete a keypress or voice response in order to continue the call in some non-limiting embodiments.

The retrieved collated information will be maintained in the user's stored Call History and Messaging conversation thread. The user can choose to add the registered information to their Contacts/Address Book application particularly if they wish to add notes or make a Nickname but the retrieved information is, in non-limiting embodiments, maintained directly in the dialer call history and/or messaging application message thread without requiring direct user action.

This rich information creates an ad hoc set of historical communications information for calls to and from organizations, with the logo, name, and reason for the call in the call history along with links to explore additional information about the entities. For unregistered numbers, non-limiting embodiments may display an icon conveying that the information is unknown, e.g., a question mark.

In a non-limiting embodiment, this rich history data may include most recent text exchanges, call-to-text responses, and additional response options for the user, e.g., request a call now, schedule future callback time, remove me from your call list, change my communications preferences with this entity, etc.

Non-limiting embodiments may utilize an information lookup service to advise the caller/sender (e.g., user) of the registered party's identity that controls the telephone number/short code/registered text messaging chatbot, who or what the caller/sender is intending to dial or has dialed, or is attempting to send a text message to. This information may be used to quickly apprise the caller of potential risks of making the call or sending the message. Risks may include initiating communications with a party that has misrepresented their identity in emails, web ads, computer malware/virus infections, voicemails, and text messages and parties that are engaging in phishing schemes or other fraudulent activities. Other risk information could include presenting the business reputation scores, e.g., the Better Business Bureau and other ratings and reviews of the service provider the user is contacting. This system may additionally be used to interrupt an on-going call with an auditory warning alert and/or displayed screen information alerting the caller about potential reports of fraudulent scam activity taking place on the number they are connected with or have previously connected with. Such pre-call or during-call information may help prevent consummation of telephone calls to numbers that are part of phishing schemes. For ongoing calls, regardless of which party initiated the call, a call interrupt service may cause termination of calls in some non-limiting embodiments. The interrupt may be made by the dialer application within the call audio media or outside of the call audio media or by the carrier within the call media. The dialer alerting system information may also be used to advise the caller of positive and adverse third-party ratings of the entities they are calling.

Non-limiting embodiments may be used to provide relevant information about the intended message receiver of an SMS, MMS, and/or RCS message to inform the sender of the verified identity of the recipient and to apprise the sender of potential risks associated with initiating or continuing communications with this recipient. For example, as reputation information is developed over time, such as a downgrade in the recipient's business reputation or an increase in purported scam activity related to a telephone number, the sender can be apprised that they may want to reconsider the safety of continuing communications with this recipient.

In non-limiting embodiments, pre-call lookup information also serves to reduce the occurrence of misdials and wrong-party calls which are a waste of time and resources for both the caller and the callee (recipient). In the messaging application, this pre-message lookup also serves to reduce the occurrence of wrong-party messages.

Non-limiting embodiments may be configured to utilize the dialer and/or messaging applications to provide communication preferences to the registered entity including opting in and out of all communications or communications via a specific channel, e.g., voice or text, expressing preferred channels, and indicating occurrences when the user believes they have received calls or texts without having provided permission to do so. This information may be transmitted by the dialer or messaging application back to the registered entity via a complaint channel as specified in the registry, to the entity that signed the outbound call or the messaging connectivity partner that technically sent the offending outbound text message, and to the user's cellular voice and messaging carrier. This information may be made available to plaintiffs' attorneys to assist in the protection of consumers rights granted under the Telecommunications Protection Act (TCPA). By offering a manage communications option with the registered entity, a user may manage whether they want to receive communications from an entity, revoke previously granted communications permissions, and/or have a history of stated permissions and preferences, e.g., text me but do not call me unless I ask, or opt out of all communications from an entity.

Non-limiting embodiments may provide a means in the dialer application and/or messaging application to request a call from the registered entity and to include in that request a call reason. This "request a call" feature may be accessed by clicking on an action button from an entry in the user's Call History or from the registered entity's name in the Message History, by clicking on a button from the in-progress call screen in the dialer application, by clicking on a button immediately upon hanging up/ending a call to the entity in the dialer application, by clicking a button in a Rich Communication Service (RCS) message, and/or by clicking a button to texting the request in a text message to the dialed number or to a registered text phone number, short code, or text messaging chatbot of the registered entity. The express written consent for this call request may be implicit in such a request but may be further validated in a resultant message to the user that confirms the user is agreeing to be called on the number (which may be a mobile number) and the user agrees the call may occur by automated means with a prerecorded message in compliance with the Telecommunications Protection Act regulations mandates or other laws/regulations for capturing express written consent. This request for a call may then be transmitted to the registered entity and entered into the registered entity's outbound call queue to service the outbound call requests. The transmission to the registered entity may occur via a pre-configured API, webhook, and/or web service configured to receive the call requests. For entities without an API/webhook/web service, the dialer application may trigger an autonomous call into the registered entity's configured call queue that waits in the call queue on behalf of the user, repeatedly asking the registered entity's agent to press a key or say an audible cue such as "call now" to initiate the call to the user. When the agent confirms, the outbound call is connected to the user's telephone number.

Non-limiting embodiments may provide authenticated user information to the entity the user is requesting the call from, e.g., this call request for this number was made from this user on their registered device and associated with this phone number. The user may choose to share name information or not in the request and further to provide a record of the requested TCPA authorization for this call.

Non-limiting embodiments may provide authentication information along with outbound calls to a registered entity that indicates whether the call is originating from a device associated with the specified telephone number attested by the carrier handling the outbound call from the user. This non-limiting embodiment pertains to a user initiating a call to an entity and either automatically transmitting or the user choosing (e.g., via a selectable option or other input) to transmit authentication information to the dialed entity. The association of the telephone number and device may be made by each of the dialer application, the operating system of the user device, and the carrier. The entity may or may not be in the user's Contacts/Address Book. In some non-limiting embodiments, the dialer application prompts the user to determine if the user wants to provide their authenticated caller ID information to the registered entity prior to initiating the call. The user can choose to include such information and the called registered entity may then use the received attestation to properly route and retrieve customer specific information automatically. In some non-limiting embodiments, this attestation information may be sent by the carrier or by the dialer application once a call has already been connected when prompted by the called entity. This authentication may be performed automatically or may be triggered by the user pressing a button on the communication application to effectuate the transmission of the authentication to the recipient entity. The recipient entity can then use this authentication of the person's identity to streamline the handling of the communication.

In some non-limiting embodiments, a user can include their properly formatted name, a photo or image, other contact usernames, e.g., social media monikers, links to profiles, and URLs, in outbound calls made from a device that is associated to their telephone number by their carrier or in combination of the dialer application with the operating system of the device and the user's carrier.

According to another non-limiting embodiment, provided is a computer program embedded in the native smartphone operating system dialer application, handset manufacturer's customized version of the operating system dialer, or third-party dialer application, e.g., Skype®, Doximity®, Signal, Teams, Zoom®, etc., wherein the act of clicking on the call button first does a lookup of the phone number's ownership from the most certifiable source of phone number ownership available, e.g., a CTIA sanctioned database, and if not found, proceeds down a ranked path of database lookups to determine ownership or control of the current phone number entered into the dialer and then presents the summary information about the entity that controls the number in a succinct manner, e.g., entity name and logo information when certified ownership/control can be authenticated. Once the entity information is presented, the caller can click a Continue button/icon/link or input a voice command to either initiate the call to the callee or to cancel such action. Additionally, in some non-limiting embodiments, the response options may include options to explore more information about the entity, e.g., additional third-party ratings, such as the Better Business Bureau, Yelp®, Google® reviews, web sites, and/or other collated synthesized information regarding the controlling entity, etc., and also to report suspicious use of the number in cases where the party controlling the number does not match the caller's idea of whom they intend to call. The explore more option may be presented within the dialer application, via the phone's messaging app in text or RCS (Rich Communication Services), via a web browser and/or read aloud speech.

In non-limiting embodiments, the caller may also be presented with an option to add the authenticated contact to their Contacts/Address Book where the authenticated information is either directly saved or is presented pre-filled in the correct fields of the new entry (but still able to be edited prior to saving). This option may be presented prior to making the call and after completing the call. If the registered owner information cannot be verified, the caller may be presented with the option of removing a pre-existing contact from the Contacts/Address Book.

In non-limiting embodiments, the caller may be presented with this pre-call lookup prior to making every outbound call.

In non-limiting embodiments, the caller may be presented with this pre-call lookup information only prior to the first time the caller calls the number or the first time the caller calls the number under an existing authenticated registration date such that, if the phone registration record is updated, the system would require a new pre-call confirmation when presented with the new information.

In non-limiting embodiments, when a threshold number of suspicious activity reports is received, or when significant changes to published ratings data occur, e.g., positive or negative changes in the Better Business Bureau, Google®, Yelp®, Dun & Bradstreet, etc., this new information may be presented prior to making the next call to this entity. This information lookup may also be provided when an incoming call from the entity is ringing or after it has been answered. This information may be presented as a pre-call interruptive stage-gated step or, as call in-flight information during the dial/connection, or as post-call information.

In non-limiting embodiments, this information may be denoted by an authenticated ownership identity icon and a ranking/ratings section of the Contacts/Address Book that is retrieved automatically or retrieved via a click or voice action.

In non-limiting embodiments, warnings about callers may be presented at any time, before, during, and/or after the call has ended with corresponding actions the user can take, e.g., End Call, End and Report, Remove from Contacts, and Block Number.

In non-limiting embodiments, the lookup service may occur asynchronously with the initiation of the dial, may occur post-dial, or may start prior to the dial but may not return and present information until the call is in progress. Additional information may be presented during the call, such as active warnings regarding complaints and/or suspicious activities and, in some embodiments, based on the security settings of the application, the call may be automatically terminated upon reaching a threshold percentage of fraud reports on the number. The dialer application and/or the user's carrier may warn the user of a rise in suspicious activity reports and terminate the call if it finds issues, such as volume spikes in scam/fraud reports.

In non-limiting embodiments, when a phone number is clicked in a messaging application, the authenticated owner information is presented with an option to call (proceed) or cancel. This screen may also offer an "explore more" information option.

In non-limiting embodiments, in web browser listings, search results, and other information service providers, e.g., Google®, Bing®, Yelp®, etc., the browser may display the synthesized certified ownership information (e.g. logo, entity name, icon conveying vetted ownership of the number) next to displayed numbers, available via hover, via a click on an identity icon, and/or in a pop-up when clicking on the phone number text or hypertext tel-tagged telephone number itself. This information is presented along with the related action options, e.g., Call or Cancel. Additional options can include "explore more," "add to Contacts/Address book," "report suspicious activity," and "provide feedback/ratings," as examples.

In non-limiting embodiments, when a phone number is displayed, the browser, search engine, web author, and/or email author may choose to display a clickable icon next to the phone number that conveys information regarding whether there is certified ownership information, non-certified information, or no information available regarding the telephone number.

In non-limiting embodiments, the same pre-caller ID service described herein may be applied to the telephone number in the messaging application such that an icon indicating the trust level and the registered brand associated with the phone number and messaging campaign can be displayed in the message application to inform the receiver who is sending the message.

In another non-limiting embodiment, with the voice or video channel, the caller/user may be apprised of the registered owner and associated reputation rating of the service provider they are considering connecting with. It can be appreciated that the source of the ownership information may be from an industry-sanctioned central database whenever possible and that the veracity of the information source may be attested to by the dialer or messaging application through a third-party source.

In a non-limiting embodiment, a long click/right click/click on a telephone number or short code anywhere it is published in communications media, such as in a text message body, the from number in messaging applications, email message bodies, and/or web pages, may provide direct access to authenticated ownership and related registered associated information and third-party ratings and reviews.

In non-limiting embodiments, anywhere a telephone number or short code is published in online media, such as in a text message body, the from number in messaging applications, email message bodies, web pages, when the user long clicks, double clicks, or right mouse clicks on the number, may provide direct access to authenticated ownership and related registered associated information such as logo, department, website URLs, social media handles, links to chat/message, and third-party ratings and reviews.

In non-limiting embodiments, telephone numbers and short codes in search engine results and other industry web site directory listings may provide the verified phone number/short code ownership information through a single click or mouse-over.

In non-limiting embodiments, the dialer and messaging applications do not automatically query and return the identity information but instead provide links to authenticate the registered service provider registered to use the number, including but not limited to organization name, logo, department, location, website, chat and/or messaging link, alternative numbers, ratings, and reviews.

In non-limiting embodiments, provided is a means to expand the entity search capabilities by telephone number and more broadly by entity name or category from within the dialer and/or messaging application, where the search results extend beyond the user's personal Contacts/Address Book and include prioritized results from the registered entity phone number, short code, and chat username database such that customer service numbers and numbers designated for inbound call support are prioritized in the listings. Departmental information may be additionally included to further refine results. All result information should specify whether the returned result is indeed an authenticated registered number for the entity in an industry association, e.g., CTIA, The Campaign Registry, Internet Engineering Task Force (IETF), Common Short Code Administration (CSCA), etc., sanctioned brand/entity, and telephone number/short code registration databases.

In non-limiting embodiments, the dialer application may preserve the authenticated logo, business name, and related business profile information accessible in the dialer application call history. For inbound calls attested via STIR/SHAKEN or a related proprietary caller ID verification service with a "reason for call" included in the rich call data, the call history may preserve the stated reason for the call. The user can review the "reason for call" and respond via text to telephone numbers that are set up to receive texts to the associated registered text messaging chatbot or to a customer service text number.

In a non-limiting embodiment, upon receiving a verified inbound call by the user, the STIR/SHAKEN Attestation Level A or related proprietary caller ID verification information may be displayed, which may appear as a green check mark with the caller ID verified, and additionally may include some or all elements of rich call display information, e.g., the entity name, logo, web site URL, reason for call, vCard or jCard (e.g., or other electronic "cards") additional information (e.g. name, photo, telephone numbers, email, location, title, role, department, categories, and note), and/or reason for the call. Some or all of these elements may be stored in the dialer application Call History. In non-limiting embodiments, a implementation of the Rich Call Display may use a publicly available website or the like to store these data elements as opposed to using a complete data object, such that items such as name, picture/logo, and reason for call, as examples, may be stored locally in the Call History of the user device (e.g., local database) while continuing to provide access to the other elements through the website (e.g., via a supplied URL). This attested caller identity and contact information may be additionally utilized by the user directly through the dialer application to report abuse, e.g., the user does not believe they had provided permission to the entity to call them on the user's telephone number, report that they are not interested, request to converse via text instead of voice, etc. The rich Call History may contain any history of working with answering call screener assistant (e.g., such as the screening tool in Phone by Google® or other like tools that allow users to see transcribed text of a speaker and to ask questions and receive responses in transcribed text from speech), voicemails, and most recent messages exchanged with this number and with the entire related entity, and call history threads with an entity even if they occur on different telephone numbers, short codes, and registered text messaging chatbots.

Figure 5:
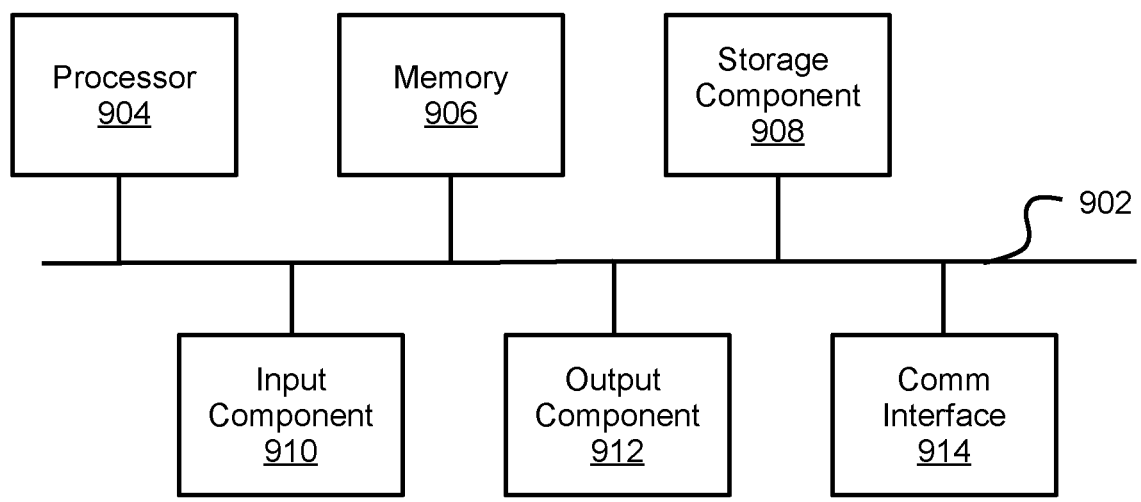
FIG. 5 illustrates example components of a computing device used in connection with non-limiting embodiments.

Referring now to FIG. 5, shown is a diagram of example components of a device 900 according to non-limiting embodiments or aspects. Device 900 may correspond to the user device and/or any other computing device described herein. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 5. Additionally, or alternatively, a set of components (e.g., one or more components) of device 900 may perform one or more functions described as being performed by another set of components of device 900.

As shown in FIG. 5, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS)

component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:
   at least one processor of a user device comprising a display and a communication application, the at least one processor programmed or configured to:
   receive, with the communication application, a communication request to initiate a communication to a callee, the communication request initiated by a user of the user device;
   determine whether to present information to the user of the user device based on recipient data associated with the callee;
   in response to determining to present information to the user, present to the user, with the user device, a warning based on the recipient data associated with the callee;
   determine whether to terminate the communication based on the recipient data associated with the callee; and
   in response to determining to terminate the communication, terminate the communication while the communication is in progress.

2. The system of claim 1, wherein the communication request to initiate the communication to the callee comprises at least one of the following: the user entering a telephone number of the callee into the communication application and dialing or sending a message, the user selecting a name of the callee on the user device, the user selecting a telephone number of the callee on the user device, the user selecting a link on the user device, the user selecting the callee or telephone number of the callee on a computing device, or any combination thereof.

3. The system of claim 1, wherein the user device comprises a mobile phone, and wherein the communication request is initiated by the user of the user device through a separate computing device.

4. The system of claim 1, wherein the at least one processor is further programmed or configured to retrieve the recipient data based on a telephone number of the callee from at least one database.

5. The system of claim 1, wherein determining whether to present information to the user of the user device is based on a score derived from the recipient data.

6. The system of claim 1, wherein the communication application comprises a dialer application, a messaging application, or any combination thereof.

7. The system of claim 1, wherein the recipient data comprises at least one of the following: a verified identity of an entity associated with the callee, crowd-sourced data, a callee telephone number history, an analytics score based on callee call activity, a ratings agency score of the callee, a government agency score of the callee, or any combination thereof.

8. The system of claim 1, wherein the recipient data comprises image data, and wherein the at least one processor is further programmed or configured to present the image data on the display of the user device prior to initiating the communication.

9. The system of claim 1, wherein the recipient data comprises a match result between the callee and at least one of a contact list, a communication history, and a previously-approved list stored on the user device, and wherein the at least one processer is further configured to automatically initiate the communication if the callee matches with the contact list and/or communication history.

10. The system of claim 1, wherein determining whether to present information to the user of the user device based on the recipient data associated with the callee comprises:
    communicating a query comprising a telephone number of the callee to a central database; and
    receiving, from the central database, a verification response based on the telephone number, the recipient data comprising the verification response.

11. The system of claim 1, wherein determining whether to present information to the user of the user device based on the recipient data associated with the callee comprises:
    communicating a query comprising the callee to at least one fraud database; and
    receiving, from the fraud database, fraud data based on the callee, the recipient data comprising the fraud data.

12. The system of claim 1, wherein the at least one processor is further programmed or configured to:

obtain communication data from at least one prior communication initiated by an entity and received by the user device, wherein the communication data comprises at least a portion of the recipient data.

13. The system of claim 1, wherein the at least one processor is further configured to prompt the user before initiating the communication to select profile data to be shared with a recipient of the communication.

14. The system of claim 1, wherein the at least one processor is further configured to:
maintain a data repository of registered entities local on the user device, wherein the recipient data comprises information from the data repository.

15. The system of claim 1, wherein the at least one processor is further programmed or configured to:
prior to determining whether to present information to the user of the user device based on the recipient data associated with the callee, communicating the communication request from the user device to a switching system; and
receiving, from the switching system, the recipient data.

16. The system of claim 1, wherein the at least one processor is further programmed or configured to:
in response to user input on the user device, display at least a portion of the recipient data.

17. A method comprising:
receiving, with at least one processor, a communication request to initiate a communication to a callee, the communication request initiated by a user of a user device;
determining, with the at least one processor, whether to present information to the user of the user device based on recipient data associated with the callee;
in response to determining to present information to the user, presenting to the user, with the user device, a warning based on the recipient data associated with the callee; and
automatically terminating the communication while the communication is in progress based on the recipient data associated with the callee.

18. The method of claim 17, wherein the at least one processor is a switch processor located remote from the user device.

19. The method of claim 17, wherein determining whether to present information to the user of the user device is based on a score generated derived from the recipient data.

20. The method of claim 17, wherein the recipient data comprises image data, the method further comprising presenting the image data on a display of the user device prior to initiating the communication.

21. The method of claim 17, further comprising:
in response to user input on the user device, displaying at least a portion of the recipient data.

22. A computer program product comprising at least one non-transitory readable medium including program instructions that, when executed by at least one processor, cause the at least one processor to:
receive a communication request to initiate a communication to a callee, the communication request initiated by a user of a user device;
determine whether to present information to the user of the user device based on recipient data associated with the callee;
in response to determining to present information to the user, present to the user, with the user device, a warning based on the recipient data associated with the callee; and
automatically terminate the communication while the communication is in progress based on the recipient data associated with the callee.

* * * * *